United States Patent Office 3,303,404
Patented Feb. 7, 1967

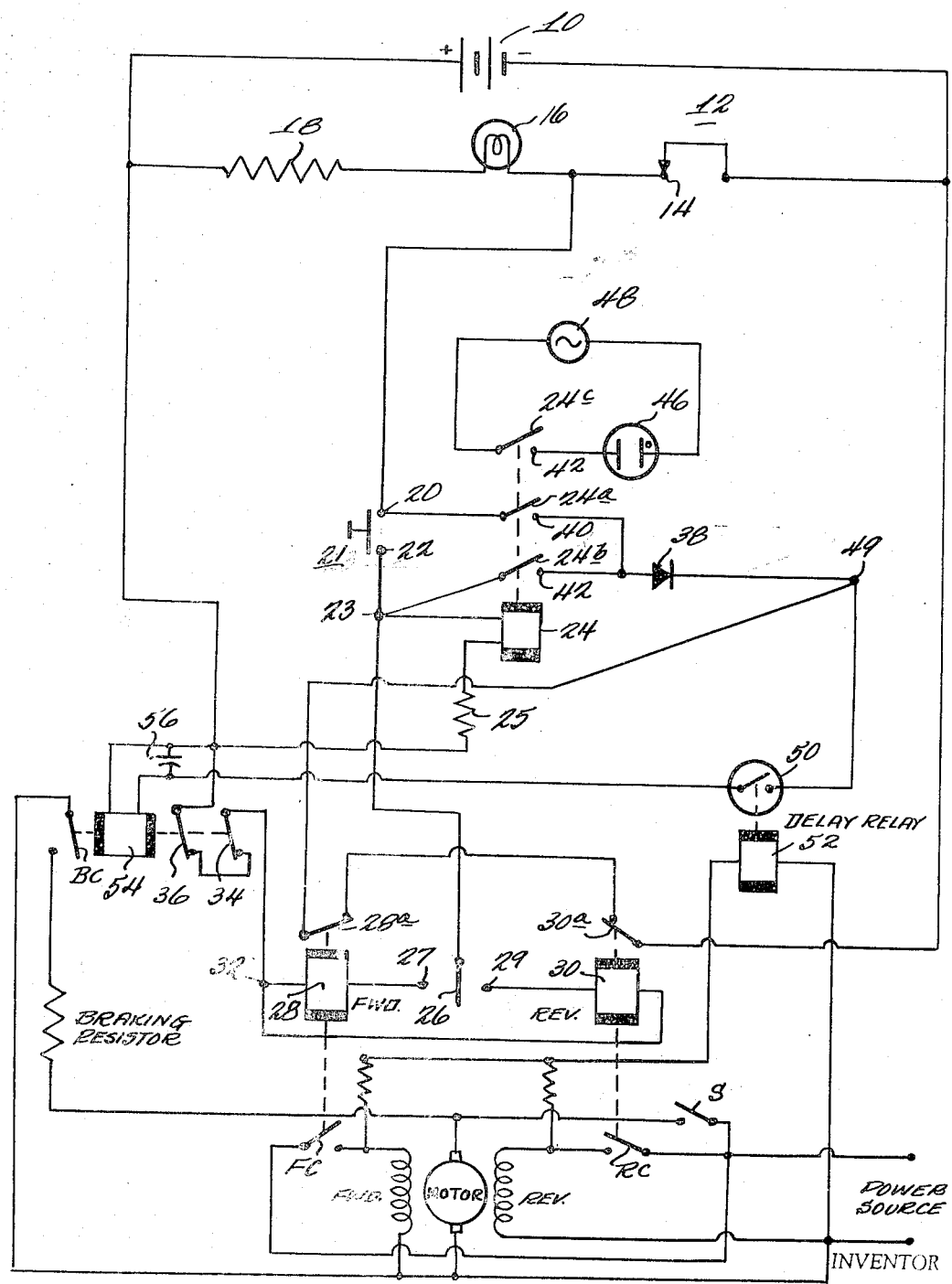

3,303,404
ARRANGEMENT FOR OVER-RIDING THE INADVERTENT ACTUATION OF A TRIP DEVICE IN A MOTOR CONTROL CIRCUIT
Edward L. Raub, Jr., New London, Conn., assignor to Wheeldex & Simpla Products, Inc., Peekskill, N.Y., a corporation of New York
Filed Dec. 18, 1963, Ser. No. 331,526
4 Claims. (Cl. 318—447)

This invention relates to a control circuit for motor driven apparatus and more particularly, to a control circuit arrangement having safety provisions for protecting the operator of apparatus such as a motor-driven file.

In the field of office filing equipment a conventional machine employed is an automatic record file having motor-driven shelves. These machines can be very dangerous to the operator unless adequate safety arrangements are provided to halt the machine should the operator come into personal contact with a moving part. A customary safety arrangement has been the use of a safety trip device, such as a bar or a chain, which is connected to suitable switching means to halt the machine when bodily contact is made with the safety trip. The opening of the switching means by actuation of the trip device usually breaks the holding circuit of a safety relay thereby de-energizing the relay to stop the drive motor. To once again start the motor, it becomes necessary to reset the device to energize the relay and close the holding circuit. This reset arrangement insures that the machine will not accidentally resume operation.

In order to be most effective, the trip device is normally positioned across the access opening to the file. Unfortunately, routine use of the file when it is halted often brings the operator into accidental contact with the trip device thereby opening the holding circuit and de-energizing the safety relay. It therefore becomes necessary to reset the device before the motor can be started. Since in this situation the safety of the operator is not in jeopardy, the resetting requirement before the motor can be started constitutes an unnecessary and annoying operation.

It is therefore an object of this invention to provide an improved, economical control circuitry for motor driven files.

Ancillary to the immediately preceding object, it is a further object of the invention to provide control circuitry having an improved safety arrangement which permits restarting of the motor without resetting of a safety relay circuit after the safety arrangement is actuated while the motor is stopped.

Another object of the invention is to provide improved control circuitry for motor driven files which incorporates a safety arrangement to insure immediate braking of the motor when a safety trip device is actuated.

A further object is to provide means for insuring that the motor braking arrangement is not energized when the motor is restarted.

Further objects and the entire scope of the invention will become more fully apparent when considered in light of the following detailed description of an illustrative embodiment of this invention and from the appended claims.

The illustrative embodiment may be best understood by reference to the accompanying schematic drawing of a control circuit for a motor driven file.

Briefly, the invention comprises a control circuit which is provided with a safety trip arrangement for protecting the operator of the motor driven file. More particularly, the energization of motor contact relays is under the control of a safety relay. When the motor is originally started, the safety relay is energized to close its contacts thereby completing a circuit to the motor contact relay coils. On closing of the safety relay contacts, a pair of relay holding circuits is completed to maintain the energization of the safety relay. A safety trip device is positioned in one of the holding circuits and auxiliary contacts associated with the motor contact relays are positioned in the second holding circuit. In operation, the safety trip device is normally closed unless physically opened by making contact with the operator. The auxiliary contacts are closed when the motor contact relays are de-energized and opened during operation of the motor. By this arrangement, when the motor is operating and the safety trip device is opened, both holding circuits are broken causing de-energization of the safety relay to thereby shut down the motor. However, when the motor is at rest with the safety relay energized, the tripping of the safety device opens only one of the two holding circuits and the safety relay maintains its energization by means of the holding circuit through the auxiliary contacts. Accordingly, the motor may be restarted without resetting. When the motor is running and the motor contact relays are de-energized, a dynamic braking arrangement is energized to quickly stop the motor. Contact means are associated with the dynamic braking arrangement to prevent starting of the motor during the braking cycle.

Referring to the drawing, the illustrative embodiment may be described. To the negative terminal of a D.C. source 10 a safety trip device 12 is connected. This device is diagrammatically illustrated as a simple switch. However, it will be understood that in the actual environment of a motor driven file, switch 12 comprises a safety bar or chain positioned across the access opening to the motor driven file. On actuation of the safety bar or chain, suitable micro-switches are opened. The safety trip device 12 in its closed position engages contact 14. Contact 14 is connected through an illuminating device 16 and a resistor 18 to the positive terminal of the D.C. source 10. The illuminating device 16 comprises a portion of a simple series circuit across the D.C. source, this device being energized when the trip device 12 is closed to thereby serve as a safety trip device indicator.

Contact 14 is also connected to one contact 20 of a push button reset switch 21. The second contact 22 of switch 21 is connected to terminal 23 and thereafter through a relay 24 and a resistor 25 to the positive terminal of the D.C. source 10.

Terminal 23 is also joined to a manually operable single pole, double throw switch comprising a movable element 26 which may be positioned to engage either of contacts 27 and 29. Contact 27 is connected to one end of a first motor contact relay coil 28 and contact 29 is connected to one end of a second motor contact relay coil 30. The opposite ends of coils 28 and 30 are joined at terminal 32. Terminal 32 is connected through normally closed contacts 34 and 36 to the positive terminal of the D.C. source 10.

The negative terminal of the source 10 is connected to the series arrangement of normally closed contacts 30a and 28a, these contacts being operatively related respectively to motor contact relays 30 and 28. Contact 28a is connected to the cathode of a diode 38, the anode of diode 38 being joined to separate contact points 40 and 42. The contact point 14 of the safety trip device 12 is joined to a movable element 24a operatively associated with contact point 40, and terminal 23 is connected to a movable element 24b similarly related to contact point 42. Moving elements 24a and 24b are ganged for operation on energization of safety relay 24 to contact points 40 and 42, respectively.

Also associated in ganged relationship with elements 24a and 24b is a movable contact 24c associated with a contact point 44. This contact arrangement is connected in series with a neon indicator lamp 46 across an A.C. source 48 to provide an indicator lamp circuit which monitors the condition of the safety relay.

To a junction point 49 between the cathode of diode 38 and the movable element of contact 28a, a time delay relay contact 50 is connected. This contact is normally open and closes on energization of a relay coil 52. Coil 52 is energized by suitable means, to be hereinafter described, when the motor is running. The contact 50 is connected through a dynamic braking relay 54 to the positive terminal of D.C. source 10. In parallel with relay 54 is a condenser 56 which shunts transient currents to more effectively render relay 54 a D.C. dynamic braking relay. This arrangement between junction 49 and the positive terminal of source 10 constitutes a dynamic braking control circuit.

Although the details of the precise motor arrangement do not constitute a part of this invention, for purposes of illustration one possible arrangement will be briefly described. A conventional motor is shown having forward and reverse field windings selectively connected to a power source through respective relay contacts FC and RC. Contact FC is normally open and is operatively related to motor coil relay 28 to close when relay 28 is energized. Similarly, contact RC is normally open and is operatively related to motor coil relay 30 to close on energization of relay 30. Current to the armature of the motor is provided upon actuation of a suitable switch S. Thus, when switch S and one of contacts FC and RC are closed, the motor operates. The direction of rotation is dependent on which of contacts FC and RC is closed.

The time delay relay 52 is connected in parallel with each of the field windings so that on energization of either winding, the relay 52 is also energized.

A conventional dynamic braking circuit is associated with the motor. It should be emphasized that the braking circuit per se does not constitute a part of the present invention. It will be appreciated that although dynamic braking is utilized in the illustrative embodiment, other conventional electric motor braking arrangements may be employed. Referring to the drawing, a braking resistor is selectively connected across the armature of the motor through the agency of a normally open relay contact BC. Contact BC is operatively related to the dynamic braking relay 54 to close when relay 54 is energized to effect dynamic braking of the motor in a well-known manner.

Now that the structure of the apparatus has been set forth, its operation will be described. Initially, the safety relay 24 is de-energized as there is no complete circuit between terminals of the D.C. source 10 passing through relay 24. On actuation of the reset push button 21, a circuit is completed from the negative terminal of source 10 through the normally closed safety trip device 12, the push button 21, terminal 23, relay 24 and resistor 25 to the positive terminal of the source. As stated previously, indicator lamp 16 is illuminated when the trip device 12 is closed. Upon energization of relay 24, movable elements 24a, 24b and 24c are simultaneously actuated to engage contacts 40, 42 and 44, respectively. The completion of a circuit through element 24c permits energization of neon lamp 46 by source 48 to indicate the condition of relay 24. On movement of elements 24a and 24b, a pair of holding circuits is established. A first holding circuit extends from the negative terminal of source 10 through the safety trip device 12, elements 24a and 24b to terminal 23 and thereafter through the relay 24, resistor 25 to the positive terminal of source 10. Since the motor has not yet begun to operate, a second holding circuit exists from the negative terminal of source 10 through normally closed contacts 30a and 28a, through diode 38 and movable element 24b to terminal 23, and thereafter through resistor 25 to the positive terminal of source 10. Consequently, on release of the reset push button switch 21, the energization of relay 24 is maintained by means of the holding circuits.

Relay 28 represents the motor contact relay for forward rotation of the motor and relay 30 represents the motor contact relay for reverse rotation thereof. For purposes of illustration, it will be assumed that the movable element 26 of the manual switch has been manipulated by the operator to engage contact point 27 to produce forward rotation of the motor. Under this condition a current path from the source 10 exists as the negative terminal thereof is connected through the safety trip device 12, movable elements 24a and 24b, terminal 23, and the movable arm of switch 26 to relay 28 and thereafter through normally closed contacts 34 and 36 to the positive terminal of source 10. The energization of relay 28 closes the appropriate motor contacts FC to permit forward rotation of the motor. Simultaneously, the energization of relay 28 opens its associated contact 28a to break one of the two holding circuits of safety relay 24.

Assuming that the operator actuates the safety bar or chain to open safety trip device 12 during operation of the motor, the other holding circuit for relay 24 is opened thereby de-energizing this relay to move elements 24a, 24b and 24c away from their respective contacts 40, 42 and 44, thereby opening the circuit to relay 28 and de-energizing lamp 46. On de-energization of relay 28, its associated contact 28a closes. Since the relay 52 has been energized during the operation of the motor, the contact 50 associated with relay 52 is closed and a circuit is thereby completed from the negative terminal of the D.C. source 10 through contacts 30a and 28a, the time delay relay contact 50 to the dynamic braking relay 54 and thereafter to the positive terminal of the source 10. Energization of relay 54 closes contact BC to effect dynamic braking as previously discussed while simultaneously opening contacts 34 and 36. The opening of these latter contacts insures that no circuit may be completed through relays 28 and 30 during the braking operation. The time delay of the relay 52 is set to maintain contact 50 closed for the period necessary to complete the braking cycle. In order to restart the motor under these conditions, it is necessary to once again actuate the push button reset switch 21 to repeat the previously described procedure.

However, the principal purpose of the invention is to obviate the operation of the push button 21 when the safety trip device is accidentally opened while the motor is stopped after normal operation. Under the situation previously set forth wherein relay 28 is energized by the actuation of moving element 26 of the manual switch, the displacement of this switch element from engagement with contact point 27 results in the de-energization of relay 28 to thereby close contact 28a. As the motor stops, both holding circuits are thereby closed to maintain current through safety relay 24. On the subsequent accidental opening of the trip device 12 to break one holding circuit, the safety relay 24 stays energized through the remaining holding circuit. Accordingly, when switch 26 is again actuated, the appropriate relay 28 or 30 is re-energized without requiring the actuation of push button reset switch 21 due to the fact that the safety relay contacts 24a and 24b are already closed.

It should here be noted that the diode 38 has been placed in the circuit to prevent a current path through the dynamic braking relay 54 when the motor is started. Under such a condition, the diode is back-biased to prevent current flow through relay 54.

The above described embodiment is illustrative of a preferred embodiment of the invention but is not intended to limit the possibilities of insuring an improved control circuitry for a motor driven file. While it has been emphasized in the illustrative embodiment that this control circuit has been designed for use with a motor driven file, it will be appreciated that the invention is applicable to other arrangements wherein a safety trip device is employed to protect the operator from continued operation of the motor. Also, the illustrative embodiment has employed manually operative means (switch 26) for selectively energizing relays 28 and 30. It should be appreciated, however, that these relays could also be appropriately energized by suitable automatic programming means. The control circuit disclosed herein is an example of an arrangement in which the inventive features of this disclosure may be utilized, and it will become apparent to one skilled in the art that certain modifications may be made without departing from the spirit of the invention as defined by the appended claims.

What is claimed is:

1. An improved control circuit for a motor driven apparatus comprising: a voltage source; a series circuit connected across said voltage source and including a trip device, a switch, and a safety relay; said trip device being closed under normal conditions to permit initial energization of said safety relay on actuation of said switch; at least two normally open, ganged contacts which close on energization of said safety relay to complete first and second holding circuits for said safety relay across the voltage source; said first holding circuit including said trip device, at least one of said ganged contacts, and safety relay; said second holding circuit including additional contact means which are open during motor operation and closed when said motor is stopped, at least one of said ganged contacts, and said safety relay; said safety relay being de-energized after initial energization only when said trip device is opened during operation of said motor.

2. A control circuit as set forth in claim 1 further comprising a braking control circuit connected in series with said additional contact means across said voltage source.

3. A control circuit as set forth in claim 1 further comprising indicator means connected to said ganged contacts and actuated on closing of said ganged contacts to indicate the energization of said safety relay.

4. A control circuit as set forth in claim 1 further comprising indicator means connected in series with said trip device across the voltage source to indicate whether the trip device is closed.

References Cited by the Examiner

UNITED STATES PATENTS

| | | | |
|---|---|---|---|
| 1,387,990 | 8/1921 | Keith | 318—261 |
| 2,137,721 | 11/1938 | Jones | 318—261 X |
| 2,472,046 | 5/1949 | Malcom | 318—261 X |
| 2,708,259 | 5/1955 | Feldhausen | 318—251 |
| 2,725,513 | 11/1955 | Eck et al. | 318—445 X |
| 2,755,423 | 7/1956 | Hager | 318—261 |
| 3,078,392 | 2/1963 | Bollesen | 318—447 X |
| 3,187,246 | 6/1965 | Garten | 318—445 X |

ORIS L. RADER, *Primary Examiner.*

J. C. BERENZWEIG, *Assistant Examiner.*